United States Patent [19]

Armbruster

[11] Patent Number: 4,694,905

[45] Date of Patent: Sep. 22, 1987

[54] PRECURED COATED PARTICULATE MATERIAL

[75] Inventor: David R. Armbruster, Forest Park, Ill.

[73] Assignee: Acme Resin Corporation, Westchester, Ill.

[21] Appl. No.: 866,523

[22] Filed: May 23, 1986

[51] Int. Cl.$^4$ .......................... B05D 7/00; B32B 27/14; B32B 27/42; E21B 43/267

[52] U.S. Cl. ................................ 166/280; 252/8.551; 427/214; 427/221; 428/404; 428/407

[58] Field of Search ...................... 166/280; 252/8.551; 427/214, 221; 428/404, 407

Primary Examiner—James C. Cannon

[57] ABSTRACT

The present invention relates to coated particulate matter wherein the particles are individually coated with a cured combination of phenolic/furan resin or furan resin to form a precured resin coating on a proppant such as sand, thereby substantially improving the chemical resistance of the proppant over one having a straight phenolic precured coating.

Another embodiment of this invention involves the use of multiple resin coatings on the particulate matter to form a final layered coating containing the desired amount of cured resin. This multiple coating of particulate material results in a final coated product that has a smoother and more uniform surface than particulate material having its entire resin coating applied in a single operation.

36 Claims, 4 Drawing Figures

PRECURED COATED PARTICULATE MATERIAL

BACKGROUND OF THE INVENTION

1. Field Of The Invention

The present invention relates to particulate material coated with a precured phenol-formaldehyde-furfuryl alcohol resin or a furan resin, wherein the precured resin coated particulate material is useful as a propping agent in fracturing, as particles in sand control, as a sand blasting abrasive or as a chemically resistant particulate material.

2. Description Of The Prior Art

Precured phenolic resin coated sands have been commercially available for use as propping agents. The term "precured" means that the phenolic resin coating is a cured coating, in contrast with particulate material coated with a curable phenolic resin, which is also commercially available.

The term "proppant" is indicative of particulate material which is injected into fractures in subterranean formations surrounding oil wells, gas wells, water wells, and other similar bore holes to provide support to hold (prop) these fractures open and allow gas or liquid to flow through the fracture to the bore hole.

The cured phenolic coating around individual particles of particulate material, such as grains of sand substantially increases the resistance of the sand grains to crushing under the high pressures encountered underground. However, there is a limit to the usefulness of these precured phenolic resin coated sands. This limit is dependent upon such factors as the increased pressure the proppant encounters at greater underground depths, and also the chemical resistance of the cured coating at the elevated temperatures and hostile chemical environment that exists underground. Thus, the cured coating can be exposed to temperatures in excess of 300° F. and can contact various types of corrosive brine solutions at these temperatures. These very hot brine solutions can degrade the resin coating and thereby reduce the crush resistance of the resin coated sand.

In an effort to produce precured coated sand proppants having greater chemical resistance than that afforded by phenolic resins, various other types of precured resin coated proppants have been suggested using such resins as epoxy resins and furan resins. However, at this time, none have been accepted commercially and only precured phenolic coated sand proppants are now available for commercial use. A deficiency of these systems is the poor chemical resistance of precured phenolic coated sands at high pH. This is a concern in steam injection wells because the steam is highly alkaline and may strip the coating off.

The patent literature dealing with this technology includes U.S. Pat. No. 4,439,489 to Johnson et al which discloses a process for preparing particulate matter coated with a cured phenolic resin which comprises mixing an uncured resin with the particulate matter at a temperature of about 300°–450° F. in the presence of about 0.03–0.5% by weight of a lubricant, and maintaining the resultant mixture above about 300° F. for a sufficient time to cure the resin, thereby obtaining a product containing individually coated particles having high abrasion resistance and improved crush resistance suitable for use as a propping agent in subterranean formations.

U.S. Pat. No. 3,935,339 to Cooke discloses coating particulate material with a liquid thermoset resin, preferably an epoxy resin, and agitating the coated particles with a liquid immiscible with the resin and containing a surfactant capable of retarding particle agglomeration as the resin cures to a solid state. A nonionic surfactant having a molecular weight of at least 2000 is preferred, and the resin is applied in sufficient amounts so that it constitutes from about 2-15 weight percent of the coated particle.

U.S. Pat. No. 3,492,147 to Young et al discloses a process for producing a resin coated particulate material in amounts wherein the particles are admixed or blended with a thermosetting resin or a polymerizable monomeric material in amounts sufficient to coat the individual particles, followed by curing the resin to a hard, infusible state, wherein the blending and curing is carried out under conditions such that little or no adherence between the individual particles occurs.

U.S. Pat. No. 4,443,347 to Underdown et al discloses a precured proppant charge comprising resin coated particles, each individually coated with a thermoset resin. The resin coating on the particles of the proppant produces a charge where the conductivity ratio throughout a given closure stress range is greater than that of a charge of the uncoated particles having substantially the same particle size distribution.

SUMMARY OF THE INVENTION

The present invention relates to coated particulate matter wherein the particles are individually coated with a cured combination of phenolic and furan resin or furan resin to form a precured resin coating on a proppant such as sand, thereby substantially improving the chemical resistance of the proppant over one having a straight phenolic precured coating.

The precured coated particles are also useful for sand control in geothermal wells, steam injection wells, and due to their superior chemical resistance, in wells that are acidized frequently.

Anothe embodiment of this invention involves the use of multiple resin coatings on the particulate matter to form a final layered coating containing the desired amount of cured resin. This multiple coating of particulate material results in a final coated product that has a smoother and more uniform surface than particulate material having its entire resin coating applied in a single operation.

DESCRIPTION OF THE PREFERRED EMBODIMENTS

Figure 1:
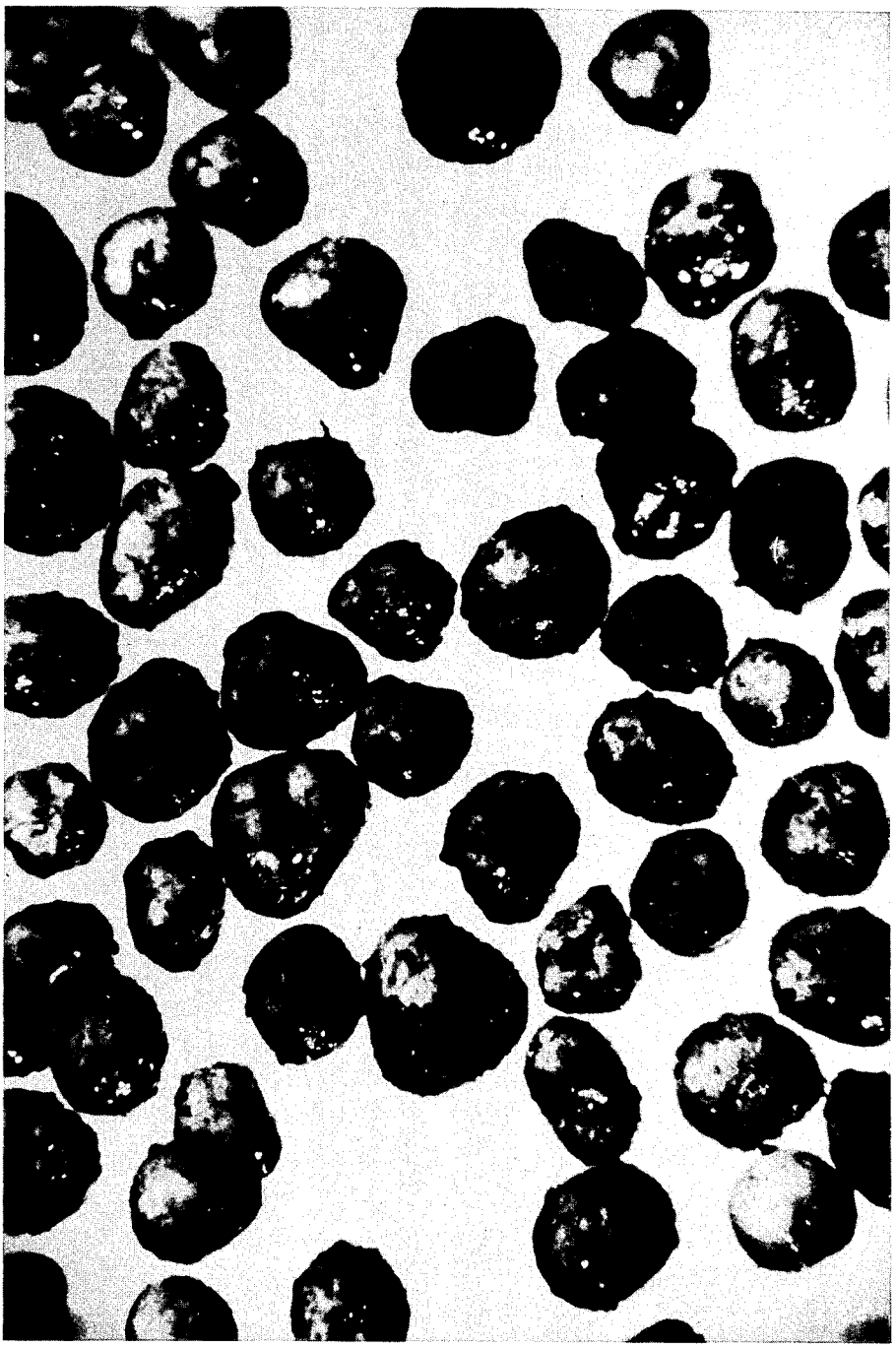

In accordance with the present invention, a furanphenolic or furan resin is used to produce a precured resin coating on a proppant such as sand, to substantially improve the chemical resistance of the coating over that of a straight phenolic precured coating.

It has also been discovered that the use of multiple coatings of resin on the particulate matter result in a final coated product with a smoother and more uniform surface than if all the resin was used to coat the particulate matter in a single application.

Accordingly, particulate matter wherein the particles are individually coated with a cured combination of phenolic and furan resin is prepared by mixing uncured thermosetting phenolic resin and uncured thermosetting furan resin or a terpolymer of phenol, furfuryl alcohol and formaldehyde with particulate matter resistant to melting at temperatures below about 450° F. The particulate matter is preheated to an operating temperature of from 225°–450° F. The resin is then added while the particulate matter is being mixed until the particulate matter becomes well coated. As mixing is continued, the resin cures on the particulate matter to produce a free flowing product comprised of individual particles coated with the cured resin.

Although it is possible to practice this invention without the use of a catalyst, it is preferred to use a curing catalyst which is sufficiently non-volatile at the operating temperatures, to accelerate the cure of the resin.

The curing catalyst can be incorporated into or premixed with the resin or added to the mixer after the resin has been added and coated on the proppant. The preferred method is to add it to the mixer after the resin has been coated. The advantage of the catalyst is that its use can result in a lower coating temperature and/or faster processing time.

The catalyst can be used as is or dissolved in water or other suitable solvent system depending on the catalyst. A strong acid catalyst must be diluted with water to prevent localized reaction of the catalyst with the resin before the catalyst has had a chance to mix with the resin. Solid catalysts that do not melt below the mixing temperature are preferably used in aqueous solution.

Specific catalysts include acids with a pKa of about 4.0 or lower, such as phosphoric, sulfuric, nitric, benzenesulfonic, toluenesulfonic, xylenesulfonic, sulfamic, oxalic, salicylic acid, and the like; water soluble multivalent metal ion salts such as the nitrates or chlorides of metals including Zn, Pb, Ca, Cu, Sn, Al, Fe, Mn, Mg, Cd and Co; and ammonia or amine salts of acids with a pKa of about 4.0 or lower, wherein the salts include the nitrates, chlorides, sulfates, fluorides, and the like.

The preferred class of catalyst is the ammonia salts of acids and the preferred catalyst is aqueous ammonium nitrate.

The amount of catalyst used can vary widely depending on the type of catalyst used, type of resin used, mixing temperature and type of mixer. In general, the amount of catalyst solids can range from about 0.2% to 10% based on the weight of the resin.

It is desirable to add a lubricant to the mix at some point after the catalyst is added and before the product "breaks down" into free flowing particles. The lubricant is preferably one that is liquid at the mixing temperature and has a sufficiently high boiling point so that it is not lost during the mixing process. Suitable lubricants include liquid silicone such as Dow Corning Silicone 200, mineral oil, paraffin wax, petrolatum, or the synthetic lubricant Acrawax CT, a bis-stearamide of a diamine, available from Glyco Chemicals, Inc., Greenwich, Conn. The amount of lubricant can vary from about 0.03% to about 0.5% by weight based upon the weight of the particulate material.

It is also desirable to include a silane additive to ensure good bonding between the resin and the particulate matter. The use of organofunctional silanes as coupling agents to improve interfacial organic-inorganic adhesion is especially preferred. These organofunctional silanes are characterized by the following formula:

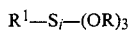

where $R^1$ represents a reactive organic function and OR represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxysilane) is an example. The silane can be premixed with the resin or added to the mixer separately.

The particulate material used in the practice of this invention can be any of the solid materials normally used as propping agents. Such materials include sand, sintered bauxite, zircon, ceramic materials and glass beads. The particulate material should be resistant to melting at temperatures below about 450° F. The individual particles are preferably of a relatively uniform size, generally ranging from about 10–100 mesh, U.S. Standard Screen size. Sands which conform to the American Petroleum Institute specifications for fracturing sands are particularly useful.

The phenolic resins used in the practice of this invention are the thermosetting resins made from phenol or substituted phenols and formaldehyde or other aldehydes. The preferred substituted phenols are where either the two ortho, one ortho and the para, or the two ortho and the para positions are unsubstituted. In general, the phenols that can be used are those which are suitable for making phenolic resins. Phenol and formaldehyde are preferred materials. Many of the phenolic resins suitable for use are called "resoles", and can be in either a liquid or solid state.

A "resole" is the resin product of the partial condensation of a phenol with an aldehyde in such proportion that the partial condensate is capable of the further condensation to an infusible or thermoset condition. A novolak phenolic resin can be used as a component with a resole which would result in a thermosetting phenolic system.

The furan resins used in the practice of this invention are the thermosetting resins made by reacting furfuryl alcohol with formaldehyde or by the selfpolymerization of furfuryl alcohol, or a combination of reacting furfuryl alcohol with formaldehyde and selfpolymerization.

Furfural can also be used in place of furfuryl alcohol. A terpolymer of phenol, furfuryl alcohol and formaldehyde can also be used in place of separate phenolic and furan resins.

The amount of resin used to coat the particulate matter will generally vary from about 1–8% and preferably about 2–4% by weight of the particulate matter.

It has also been found that multiple coatings of resin on the particulate material result in a final coated product that has a smoother and more uniform surface than would result if all of the resin was coated on the particulate matter in one operation. Smoother coatings produce a proppant with less resistance to fluid flow.

In the multiple resin coating process, the incremental amount of uncured resin should be sufficient to form a continuous coating on the entire surface of the particle. For certain applications, this amount can be about 10% by weight of the total amount of resin, leaving the remaining 90% of the total amount of resin as one or more increments. Preferably, any one increment should not exceed about 70%, and most preferably about 50% by weight of the total amount of resin.

The multiple resin coating process also helps prevent the formation of resin dust which can occur during the curing process if the entire amount of resin is added in one operation. Resin dust is composed of small particles of cured resin which break off from the resin coating during the curing step. This can occur during the mixing action as the resin cures on the sand. The mixing action can abrade small dustlike particles of resin from the resin coating as it cures. This is more likely to occur at higher resin levels, such as where the incremental amount of uncured resin exceeds about 50% by weight of the total amount of uncured resin used to coat the particulate material.

Therefore, if a 4 weight % coating is desired, it can best be accomplished by applying two or more coatings of 2 weight % or less in two or more separate steps or applications to achieve a final coating of 4 weight %.

The first portion or incremental amount of the resin is added to the heated particulate matter and mixed together until the particulate matter is sufficiently coated, whereupon the required amount of catalyst is then added to the mix to cure the resin. After the resin has cured and the mix breaks down into free flowing particles, a second addition of resin is added to the previously coated particulate material followed by a second addition of catalyst. Mixing is continued until the second addition of resin cures and the particulate material again breaks down into free flowing particles. It is also desirable to add a lubricant to the mix some time after the last catalyst addition and before the mix "breaks down", as disclosed in U.S. Pat. No. 4,439,489 to Johnson et al.

The multiple coating process of the present invention can also be used where the resin is to be divided into three or more equal parts. Moreover, it is not necessary that the resin be divided into equal parts to obtain the advantages of the multiple coating process. Unequal amounts also give suitable results.

The precured coated particulate material can also be placed in a oven or other source of heat after being discharged from the mixer. This heating referred to as "postbaking" insures a more complete cure of the resin. It also can be used to shorten processing time in the mixer. The final stages of cure can be completed in postbaking equipment rather than holding the coated particulate material in the mixer to accomplish this purpose. Temperatures of about 200° F. or higher can be used during the postbaking step.

The examples which follow serve to illustrate the present invention, and all parts and percentages are by weight unless otherwise indicated, and all screen mesh sizes are U.S. Standard Screen sizes.

EXAMPLE 1

Into a 5 liter three necked flask equipped with a stirrer, thermometer and reflux condenser were charged 1000 grams of furfuryl alcohol, 1000 grams of 50% formalin and 48 grams of 25% zinc acetate solution in water. The flask was then heated until the contents reached a temperature of 97° C. This temperature was held for 3 hours and 15 minutes at which time a sample was taken from the flask. This sample was checked for formaldehyde content and found to contain 22.0% formaldehyde which corresponds to 50 grams of formaldehyde being consumed in the reaction. At 3 hours and 50 minutes of total reaction time the batch was cooled to about 50° C. by vacuum dehydration and dehydrated to remove 452 grams of distillate. 1000 grams of phenol was then added to the flask and the batch heated to reaction temperature. The temperature was 99° C. at the start of the reaction with phenol present and dropped to 97° C. after 6 hours and 35 minutes of reaction time. The batch was then cooled with cooling water to give a final product with the following properties: Viscosity: 726 centipoise at 25° C.; unreated formaldehyde: 1.6%; unreacted furfuryl alcohol: 3.8%; unreacted phenol: 18.1%, refractive index: 1.533 at 25° C.

EXAMPLE 2

Into a 3 quart mixing bowl was placed 1 kilogram of 20/40 mesh Badger Mining silica sand. The sand was stirred with a Hobart C-100 Mixer (Hobart Manufacturing Co., Troy, OH) and heated to 412° F. with a gas flame. 20 grams of Example 1 resin was added and mixing continued for 20 seconds before 0.3 grams of A1100 silane (Union Carbide Corp.) was added. At 50 seconds of mixing time 1 milliliter of 25% ammonium nitrate solution in water was added which catalyzed the cure of the resin and caused the mix to break down from a dough like wet mix to a free flowing mix of individually coated sand grains. At 85 seconds 20 additional grams of the same resin was added as mixing continued. At 110 seconds 1 milliliter of 50% ammonium nitrate solution was added and before 155 seconds the mix had broken down and became free flowing. At 155 seconds, 20 additional grams of the same resin were added to the mix followed by 1 milliliter of 50% ammonium nitrate at 180 seconds. At 200 seconds 1 gram of L-45 silicone fluid (Union Carbide Corp.) was added as mixing continued. After the addition of the L-45 silicone fluid the mix again "broke down" to become a free flowing mix of individually coated sand grains. Mixing was continued for a total of 350 seconds at which time the mix temperature was 278° F. At this time the mix consisted of individual sand grains coated with a cured film of phenolic-furan resin and was removed from the bowl and allowed to cool. Further testing of the precured coating sand and the results obtained are tabulated in Tables I and II.

EXAMPLE 3

(a) Resin Preparation

Into a 5 liter three necked flask equipped with a stirrer, thermometer and reflux condenser were charged 1000 grams of phenol, 1150 grams of 50% formalin and 48 grams of 25% zinc acetate solution in water. The flask was heated and the batch reached a temperature of 99° C. and was reacted for 4 hours and 15 minutes. During this reaction the batch temperature gradually fell from 99° C. to 96° C. At this time the batch was cooled with cooling water and a sample checked for formaldehyde content which was 9.0% formaldehyde corresponding to 377 grams of formaldehyde being reacted with the phenol. The batch was then vacuum dehydrated at about 50° C. to remove 558 grams of distillate. 1015 grams of furfuryl alcohol was then added to flask and the reaction continued for 5 hours and 40 minutes at about 97° C. The batch was then cooled to give a product with the following properties: Viscosity: 1,650 centipoise at 25° C.; unreacted phenol: 6.7%; unreacted furfuryl alcohol: 11.0%

(b) Coating Process

The same coating procedure detailed in Example 2 was used with the following components:
1000 grams 20/40 sand
20 grams part (a) resin
0.3 grams A1100 silane
1 milliliter 25% ammonium nitrate solution
20 grams part (a) resin
¾ milliliter 50% ammonium nitrate solution
20 grams part (a) resin
1 milliliter 50% ammonium nitrate solution
1 gram of L-45 silicone fluid Two mixes were coated and combined as the sample. The first mix had a starting sand temperature of 412° F. and at 350 seconds the temperature wa 294° F. The second mix had a 400° F. starting sand temperature and at 350 seconds the temperature was 284° F. At 350 seconds both mixes consisted of individual particles coated with a cured film of phenolic-furan resin. Further testing of the precured coated sand and the results obtained are tabulated in Tables I and II.

EXAMPLE 4

(a) Resin Preparation

Into a 5 liter three necked flask equipped with a stirrer, thermometer and reflux condenser were charged 1000 grams of phenol, 1150 grams of 50% formalin and 41 grams of lead acetate Pb(CH3COO)$_2$.3H$_2$O. The batch was reacted for 4 hours and 15 minutes, during which time the temperature varied from 100° to 104° C. The batch was then cooled by vacuum dehydration and checked for unreacted formaldehyde which was 2.8% by weight. An additional 200 grams of 50% formalin was added to the batch and approximately 660 grams of distillate was removed by vacuum dehydration at approximately 50° C. 1015 grams of furfuryl alcohol was then added and the batch reacted for 3 hours and 15 minutes at approximately 100° C. At this time the reaction mixture was cooled by applying cooling water to the flask. The reaction product had a viscosity of 2680 centipoise at 25° C. 80 grams of water was added to reduce the viscosity to 1,910 centipoise at 25° C. The final product contained 1.0% unreacted formaldehyde, 4.9% unreacted phenol and 12.1% unreacted furfuryl alcohol.

(b) Coating Process

The same coating procedure detailed in Example 2 was used to coat the resin of part (a) onto 20/40 sand. The following components were used and the times of addition are given. 1000 grams of 20/40 sand were heated to 405° F.

0 seconds—20 grams of part (a) resin
22 seconds—0.3 grams of A1100 silane
42 seconds—0.5 milliliters of 12.5% ammonium nitrate solution
78 seconds—20 grams of part (a) resin
96 seconds—1 milliliter of 12.5% ammonium nitrate solution
136 seconds—20 grams of part (a) resin
156 seconds—1 milliliter of 25% ammonium nitrate solution
187 seconds—1 gram of L-45 silicone fluid
300 seconds—Coated sand at 263° F., removed from bowl.

After the coated sand was removed from the bowl, it was placed in a tray and put into a 350° F. oven for 12 minutes. Further testing of the precured coated sand and the results obtained are tabulated in Tables I and II.

EXAMPLE 5

(a) Resin Preparation

Into a 5 liter 3 necked flask equipped with a stirrer, thermometer, and reflux condensor were charged 2000 grams of furfuryl alcohol, 1000 grams of 50% formalin and 80 grams of a 25% water solution of zinc acetate. Heat was applied to the flask and the contents reacted for 3 hours at a temperature of 95°–97° C. The reaction mixture was then cooled by dehydration and dehydrated at about 50° C. to remove 590 grams of distillate. The reaction was then continued for 20 hours and 55 minutes at 97°–98° C. with steam heat. At this time, the free formaldehyde level had dropped to 3.2% and the batch was cooled by applying cooling water into the flask. The product had a viscosity of 1690 centipoise at 25° C. 50 grams of water were added to reduce the viscosity to 1115 centipoise. The final product had 15.5% unreacted furfuryl alcohol and 6.4% water.

(b) Coating Process

The same coating equipment and 9eneral procedure used in Example 2 was used to coat a 50/50 by weight, blend of the furan resin (furfuryl alcohol-CH$_2$O resin) from (a) and a phenolic resole (phenol-CH$_2$O resin). The resole that was used is a commercial product sold by Acme Resin Corp. (Acme Resin 970). The following components were used and the times of addition given. 1000 grams of 20/40 sand heated to 408° F. were used:

0 seconds—20 grams of resin
35 seconds—0.5 milliliter of 12.5% ammonium nitrate solution
70 seconds—20 grams of resin
95 seconds—1 milliliter of 12.5% ammonium nitrate solution
130 seconds—20 grams of resin
155 seconds—1 milliliter of 25% ammonium nitrate solution
175 seconds—1 gram of L-45 Silicone
320 seconds—Coated sand at temperature of 272° F., was removed from bowl After the coated sand was removed from the bowl, it was allowed to cool to room temperature for further testing, with the results tabulated in Tables I and II.

TESTING OF PRECURED COATED SANDS

The four precured coated sands of Examples 2 to 5, were tested for crush resistance by the American Petroleum Institute (API) recommended practice for testing high strength proppants used in hydraulic fracturing operations. 6th draft, Section 7, May 1985. The sands were also tested for the amount of cured resin remaining on the precured sand after heating in a 1700° F. muffle furnace and recording the % weight loss on ignition (L.O.I.). In the crush resistance test procedure, 40 grams of sand were placed in a 2-inch cylinder die test cell. Ten thousand psi pressure was applied to the die over a period of 1 minute. This pressure was held for 2 minutes before the sand was removed and screened to remove any crushed sand grains. The crushed sand grains were then weighed to determine the percent crushed.

TABLE I

| Test Sand | % L.O.I. | % Crushed-10,000 psi |
|---|---|---|
| Example 2 | 3.87% | 0.7% |
| Example 3 | — | 0.4% |
| Example 4 | 3.82% | 1.0% |
| Example 5 | 3.6% | 2.4% |
| Uncoated Control | — | 25.8% |

The coated sand of Example 3 was also tested for resistance to chemical degradation by hot sodium hydroxide solution against a commercially available straight phenolic coated precured sand (AcFrac® PR 20/40, Acme Resin Corporation, Forest Park, Ill.) having the same resin level and coated on the same 20/40 mesh sand. The test was run by covering separate samples of the sand with 0.4% and 4% water solutions of sodium hydroxide in glass jars which were then sealed and placed in an oven at 160° F. for 24 hours. The temperature was then raised to 200° F. for an additional 24 hours. After the hot caustic soak the sand was removed from each of the jars, washed with water, dried and tested for crush resistance using the A.P.I. test.

TABLE II

| Test Sand | 0.4% NaOH % Crushed-10,000 psi | 4% NaOH % Crushed-10,000 psi |
|---|---|---|
| AcFrac PR 20/40 (phenolic coating) | 1.0% | Resin removed from sand |
| Example 3 (phenolic-furan coating) | 0.6% | 1.2% |

The results of Table II show that the phenolic-furan precured coated sand was much more resistant to hot caustic solution than the phenolic coated sand. Notably, while the 4% NaOH solution destroyed the phenolic resin coating the phenolic-furan coating remained intact and the proppant had very good crush resistance. The precured coated sand of Example 3 was also tested for its solubility in acid using the API Recommended Practice for Testing High Strength Proppants Used in Hydraulic Fracturing Operations, 6th draft, Section 6, May 1985. This test determines the weight loss of a proppant exposed to a water solution of 12% HCl by weight plus 3% HF by weight at 150° F. The solubility of a proppant using this test is an indication of chemical stability. The phenolic-furan coated sand had a weight loss of 0.1% while the same sand coated with the same level of phenolic resin (AcFrac ® PR) had a weight loss of 0.3%.

EXAMPLE 6

Comparison of Single Coating With Multiple Coated Sand Particles

The resin of Example 3(a) was used to prepare two precure coated sand proppants. In one case the resin was applied as a single coat and in the other as a three layer multiple coat. The same equipment of the previous examples was used. The following weigh-ups and coating procedures were used:

| Single Coat | Multiple Coating (Three Coats) |
|---|---|
| 1000 grams - 20/40 sand | 1000 grams - 20/40 sand |
| 60 grams - resin | 20 grams - resin (1) |
| 0.3 grams - A1100 silane | 0.3 grams - A1100 |
| 3 milliliters - 14% NH$_4$Cl in water | 1 milliliter - 14% NH$_4$Cl (1) |
| 1 gram - L-45 silicone fluid | 20 grams - resin (2) |
|  | 0.75 milliliters - 28% NH$_4$Cl (2) |
|  | 20 grams - resin (3) |
|  | 1 milliliter - 28% NH$_4$Cl (3) |
|  | 1 gram - L-45 |
| Operating Sequence |  |
| 0 sec - sand temp. 412° F. | 0 sec - sand temp. 412° F. |
| resin added | resin (1) added |
| 15 sec - A1100 added | 15 sec - A1100 added |
| 50 sec - catalyst added | 50 sec - catalyst (1) added |
| 70 sec - L-45 added | 80 sec - resin (2) added |
| 390 sec - sand temp. 274° F. removed from mixing bowl. | 115 sec - catalyst (2) added |
|  | 150 sec - resin (3) added |
|  | 185 sec - catalyst (3) added |
|  | 200 sec - L-45 added |
|  | 390 sec - sand temp. 267° F. |

-continued

| Single Coat | Multiple Coating (Three Coats) |
|---|---|
|  | removed from mixing bowl. |

The above precure coated sands were postbaked for 15 minutes at 320° F. after they were removed from the mixing bowl. After cooling they were tested for crush resistance at 10,000 psi (A.P.I. Test). The single coat sand had 1.5% crushed while the multiple coated sand had 0.6% crushed. Both sands were examined by microscope to determine the uniformity of the coating on each.

Figure 2:
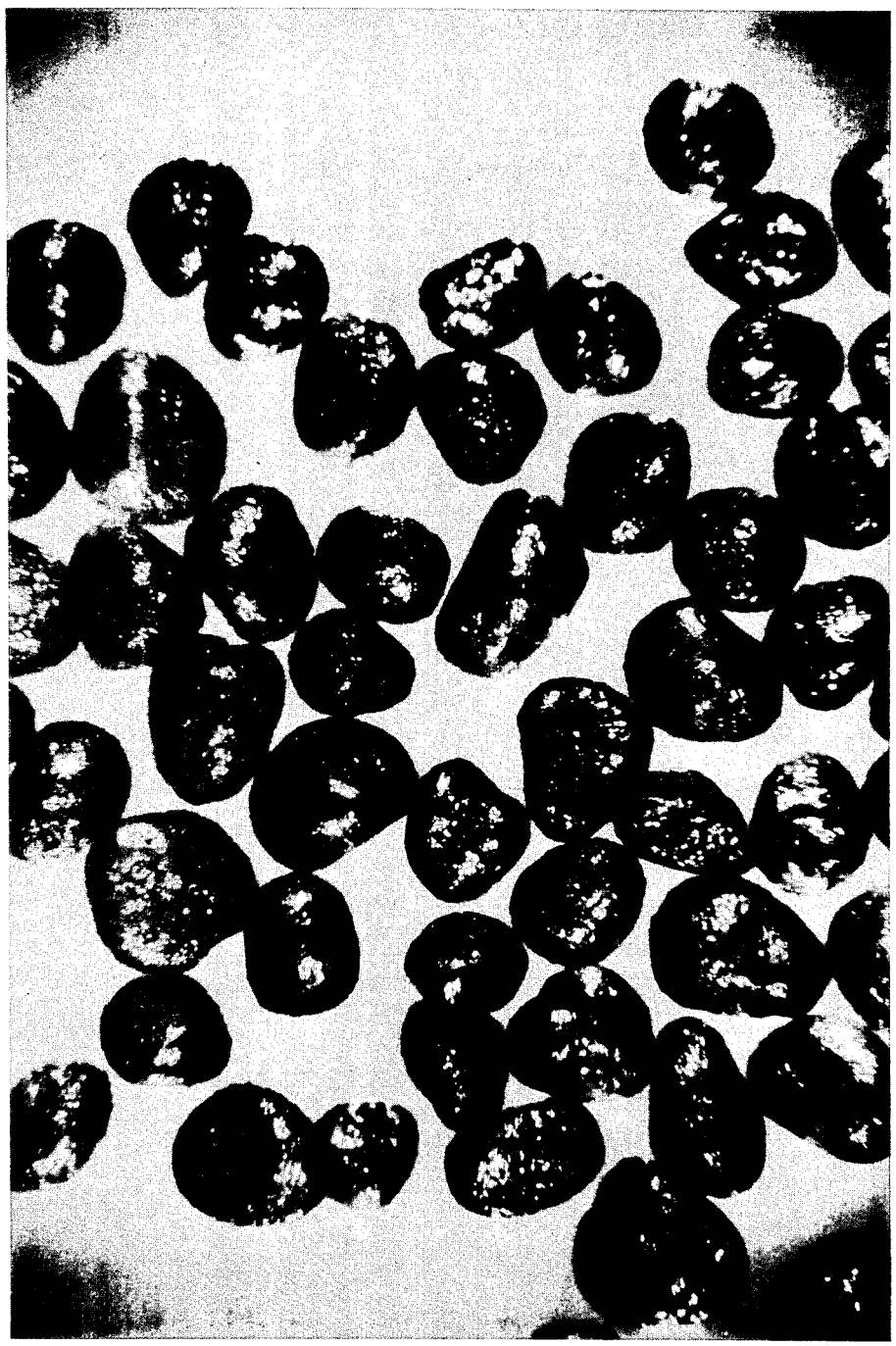
Figure 3:
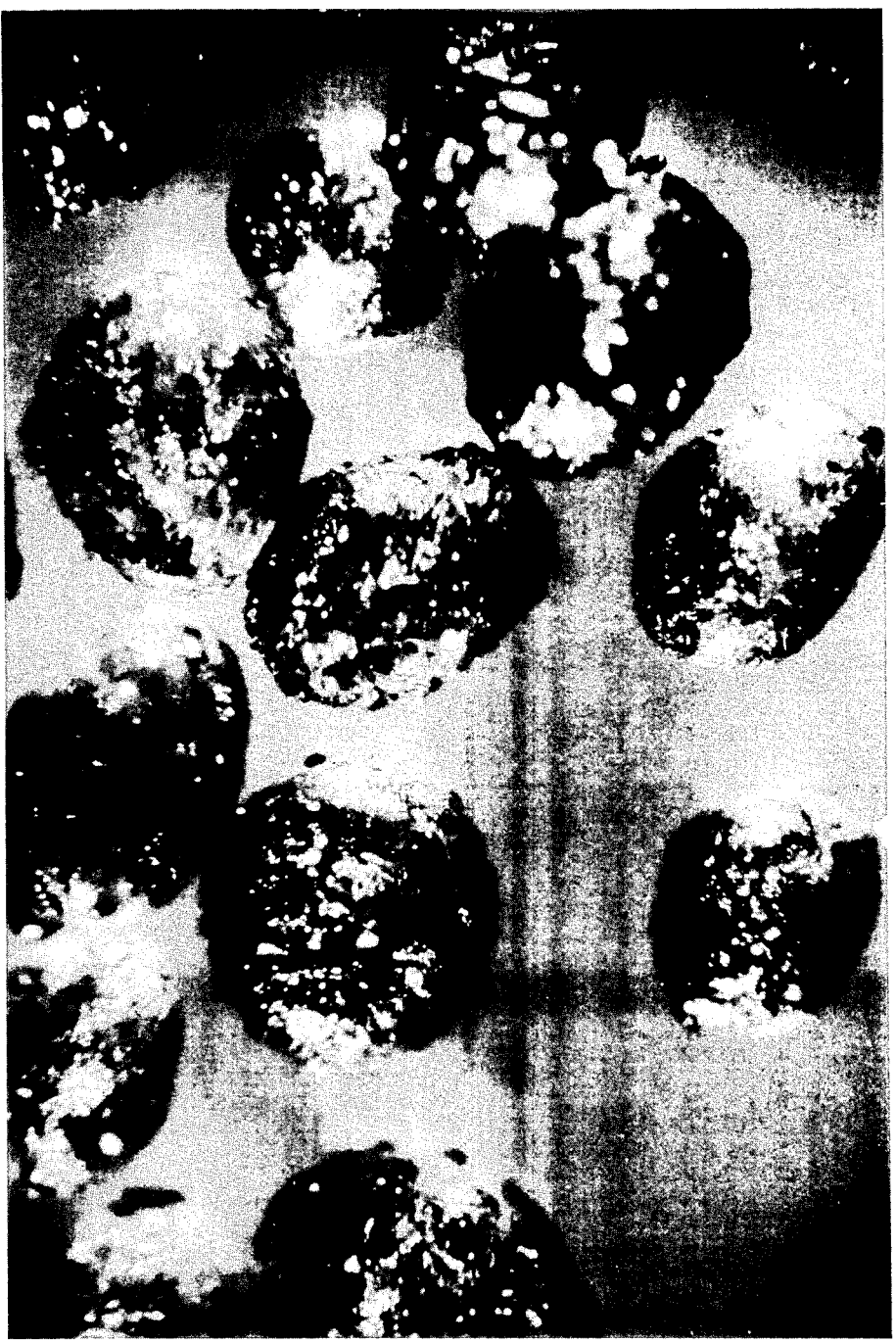
Figure 4:
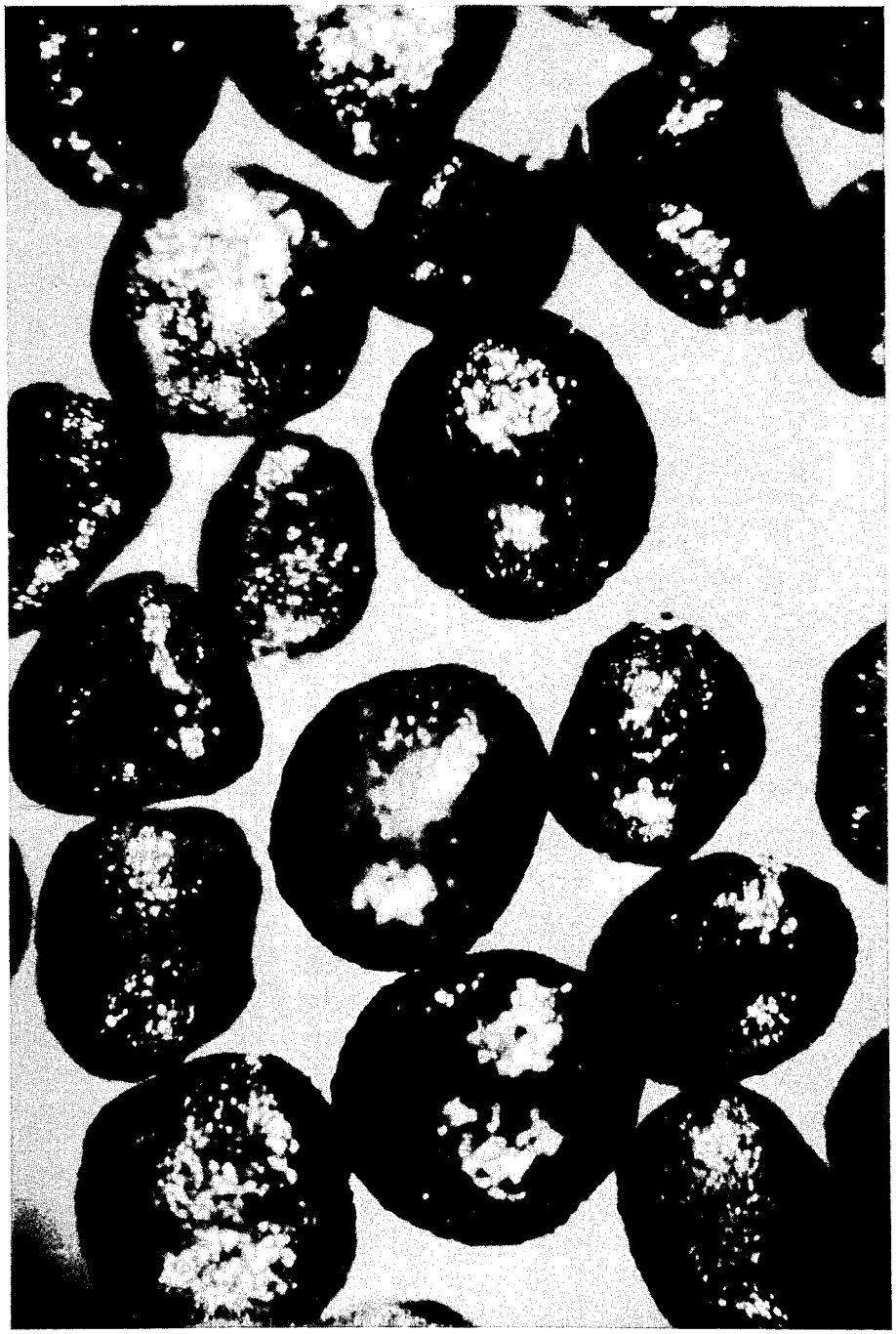

FIGS. 1 and 2 are photomicrographs of the single coating and multiple coated sands, respectively, at 50× magnification. A comparison of these Figures shows that the FIG. 1 single coating on the sand particles was non-uniform and uneven, whereas the FIG. 2 multiple coated sand particles were uniform and smooth. The distinction becomes more apparent with photomicrographs at 100×magnification, wherein FIG. 3 represents the single coating sand particles and FIG. 4 the multiple coated sand particles.

What is claimed is:

1. Coated particulate material consisting essentially of particles resistant to melting at temperatures below about 450° F., said particles individually coated with one or more layers of a cured resin selected from the group consisting of:
    (a) the combination of a phenolic resin and a furan resin; or
    (b) the terpolymer of a phenol, furfuryl alcohol and an aldehyde.

2. The composition of claim 1, wherein said phenolic resin moiety comprises thermosetting resins containing phenol or substituted phenols where either the two ortho, one ortho and the para, or the two ortho and the para positions are unsubstituted, and formaldehyde or other aldehydes.

3. The composition of claim 2, wherein said phenolic resin moiety is phenol-formaldehyde.

4. The composition of claim 1, wherein said furan-phenolic resin is a terpolymer of phenol, furfuryl alcohol, and formaldehyde.

5. The composition of claim 1, wherein said phenolic resin moiety is a resole.

6. The composition of claim 1, wherein the furan resin moiety is selected from the group consisting of the reaction product of furfuryl alcohol with formaldehyde, the self-polymerization of furfuryl alcohol, or combinations thereof.

7. The composition of claim 6, wherein furfural is used in place of furfuryl alcohol.

8. A process for producing coated particulate material consisting essentially of particles resistant to melting at temperatures below about 450° F., comprising: mixing an uncured thermosetting resin with said particulate matter preheated to temperatures of about 225°–450° F., wherein the resin is selected from the group consisting of furan, the combination of a phenolic resin and a furan resin, or a terpolymer of phenol, furfuryl alcohol and formaldehyde; maintaining the particulate matter-resin mixture at a temperature of above about 200° F. for a time sufficient to cure the resin.

9. The process of claim 8, wherein the particulate matter resin mixture is contacted with a catalyst selected from the group consisting of:

(a) acids with a pKa of about 4.0 or lower;
(b) water soluble multivalent metal ion salts; and
(c) ammonia or amine salts of acids with a pKa of about 4.0 or lower.

10. The process of claim 9, wherein the acids from step (a) are selected from the group consisting of phosphoric, sulfuric, nitric, benzenesulfonic, toluenesulfonic, xylenesulfonic, sulfamic, oxalic and salicylic acid.

11. The process of claim 9, wherein the salts of step (b) are selected from the group consisting of nitrates and chlorides.

12. The process of claim 9, wherein the metal moiety of step (b) is selected from the group consisting of Zn, Pb, Mn, Mg, Cd, Ca, Cu, Sn, Al, Fe and Co.

13. The process of claim 9, wherein the salts of step (c) are selected from the group consisting of nitrates, chlorides, sulfates and fluorides.

14. The process of claim 9, wherein the catalyst comprises an ammonia salt of an acid having a pKa of about 4 or lower.

15. The process of claim 11, wherein the particulate matter is selected from the group consisting of sand, bauxite, zircon, ceramic particles, glass beads and mixtures thereof.

16. The process of claim 15, wherein the particulate matter is sand that varies from about 10-100 mesh in size.

17. Precured coated particles made in accordance with the process of claim 8.

18. The precured coated particles of claim 17 used in fracturing of subterranean formations.

19. The precured particles of claim 17 used in sand control.

20. A process for preparing particulate matter coated with incremental layers of a cured resin, comprising:
(a) mixing an incremental amount of uncured resin selected from the group consisting of furan, the combination of a phenolic resin and a furan resin, or a terpolymer of phenol, furfuryl alcohol and formaldehyde, with particulate matter resistant to melting at temperatures of about 450° F., and heating at a temperature of about 225°-450° F. for a time sufficient to coat said particulate matter with the resin;
(b) contacting the resin coated particulate matter with a catalyst selected from the group consisting of:
(i) acids with a pKa of about 4.0 or lower;
(ii) water soluble multivalent metal ion salts; and
(iii) ammonia or amine salts of acids with a pKa of about 4.0 or lower; and
(c) repeating steps (a) and (b) until the total amount of resin coated on the particulate matter in incremental multiple layers is sufficient to produce a final coated particulate product that has a smoother and more uniform surface than if the total amount of resin was added in one application.

21. The process of claim 20, wherein the acids from step (i) are selected from the group consisting of phosphoric, sulfuric, nitric, benzenesulfonic, toluenesulfonic, xylenesulfonic, sulfamic, oxalic and salicylic acid.

22. The process of claim 20, wherein the salts of step (ii) are selected from the group consisting of nitrates and chlorides.

23. The process of claim 20, wherein the metal moiety of step (ii) is selected from the group consisting of Zn, Pb, Ca, Cu, Sn, Al, Fe, Mn, Mg, Cd and Co.

24. The process of claim 20, wherein the salts of step (iii) are selected from the group consisting of nitrates, chlorides, sulfates and fluorides.

25. The process of claim 20, wherein the total amount of cured resin used to coat the particulate matter varies from about 1-8% by weight of the particulate matter.

26. The process of claim 20, wherein said catalyst is an aqueous solution of ammonium nitrate.

27. The process of claim 20, wherein the incremental amount of uncured resin is sufficient to form a continuous coating on the entire surface of the particulate material.

28. The process of claim 27, wherein the incremental amount of uncured resin is about 50% by weight of the total amount of cured resin.

29. The process of claim 27, wherein the incremental amount of uncured resin is about 70% by weight of the total amount of cured resin.

30. The process of claim 27, wherein the incremental amount of uncured resin is about 90% by weight of the total amount of cured resin.

31. The process of claim 20, wherein about 0.03 to about 0.5 weight percent of a lubricant is added to the mixture of particulate matter and uncured resin.

32. The process of claim 31, wherein the lubricant is added after the last amount of catalyst is added and before the mixture breaks down.

33. The process of claim 24, wherein the particulate matter is heated to about 225°-450° F. prior to contacting with said resin.

34. Precured coated particles made in accordance with the process of claim 20.

35. The precured coated particles of claim 34 used in fracturing of subterranean formations.

36. The precured particles of claim 34 used in sand control.

* * * * *